United States Patent
Rao

(10) Patent No.: US 11,941,690 B2
(45) Date of Patent: *Mar. 26, 2024

(54) REDUCING ACCOUNT CHURN RATE THROUGH INTELLIGENT COLLABORATIVE FILTERING

(71) Applicant: PAYPAL, INC., San Jose, CA (US)

(72) Inventor: Collu Rohit Rao, Chennai (IN)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/164,818

(22) Filed: Feb. 6, 2023

(65) Prior Publication Data

US 2023/0196451 A1    Jun. 22, 2023

Related U.S. Application Data

(63) Continuation of application No. 16/714,634, filed on Dec. 13, 2019, now Pat. No. 11,574,361.

(51) Int. Cl.
*G06Q 40/02* (2023.01)
*G06Q 20/40* (2012.01)
*G06Q 30/0201* (2023.01)
*G06Q 40/12* (2023.01)

(52) U.S. Cl.
CPC ........... *G06Q 40/02* (2013.01); *G06Q 20/407* (2013.01); *G06Q 30/0201* (2013.01); *G06Q 40/125* (2013.12)

(58) Field of Classification Search
CPC .. G06Q 40/02; G06Q 20/407; G06Q 30/0201; G06Q 40/125
See application file for complete search history.

(56) References Cited

U.S. PATENT DOCUMENTS

| 2006/0173739 A1 | 8/2006 | Heywood |
| 2007/0185867 A1 | 8/2007 | Maga et al. |

(Continued)

OTHER PUBLICATIONS

Guinn J., "What is a Merchant Service Provider—And Why Do They Matter," Retrieved from Internet URL: https://www.softwareadvice.com/resources/what-is-a-merchant-service-provider/, Retrieved on Jan. 6, 2017, 5 pages.

(Continued)

*Primary Examiner* — Elda G Milef
(74) *Attorney, Agent, or Firm* — Haynes and Boone, LLP

(57) ABSTRACT

There are provided systems and methods for reducing account churn rate through intelligent collaborative filtering. A user may utilize an online account with the service provider to perform various actions and generate account usage data, such as usage of various service subcategories of the service provider or different subcategorizations for the user. Based on the current user's usage of services and other subcategorizations of the user, the user may be compared to other past users that have left the service provider utilizing collaborative filtering for matching users and user vectorization. For example, a matrix of the past users may be made based on the number of matching user that fall into the same categorizations. Each row of the matrix may be vectorized and compared to current user. If this comparison indicates potential attrition of the account, a remediation action may be taken.

20 Claims, 6 Drawing Sheets

(56) References Cited

U.S. PATENT DOCUMENTS

| | | | |
|---|---|---|---|
| 2008/0208786 A1* | 8/2008 | Serrano-Morales | G06N 5/025 706/47 |
| 2014/0172507 A1 | 6/2014 | Menon | |
| 2017/0220933 A1* | 8/2017 | Gonguet | G06N 20/00 |
| 2020/0327449 A1 | 10/2020 | Tiwari et al. | |
| 2020/0410390 A1* | 12/2020 | Fu | G06F 11/302 |
| 2021/0192548 A1 | 6/2021 | Wang et al. | |

OTHER PUBLICATIONS

Khan M.R., et al., "Behavioral Modeling for Churn Prediction: Early Indicators and Accurate Predictors of Custom Defection and Loyalty," 2015 IEEE International Congress on Big Data, Dec. 20, 2015, 4 pages.

Quantzig., "Churn Analysis Engagement for Leading Payment Gateway Service Provider," Business Wire, Mar. 7, 2019, 4 pages.

Umair A., et al., "Product Recommendation Using Typicality Based Collaborative Filtering and Churn Analysis," 2016 Sixth International Conference on Innovative Computing Technology (INTECH), 2016, pp. 220-225, DOI: 10.11 09/INTECH.2016.7845012.

* cited by examiner

| Subcat \ Subcat | Chartered Accountant | Loans | Placement Consultancies | Coaching & Tuitions | Website Services |
|---|---|---|---|---|---|
| Chartered Accountant 1102b | 40 | 2 | 23 | 0 | 2 |
| Loans 1104b | 2 | 40 | 0 | 1 | 1 |
| Placement Consultancies 1106b | 23 | 0 | 48 | 1 | 0 |
| Coaching & Tuitions 1108b | 0 | 1 | 1 | 50 | 0 |
| Website Services 1110b | 2 | 1 | 0 | 0 | 40 |

Table 1100

REDUCING ACCOUNT CHURN RATE THROUGH INTELLIGENT COLLABORATIVE FILTERING

CROSS-REFERENCE TO RELATED APPLICATION

This application claims priority to and is a continuation of U.S. patent application Ser. No. 16/714,634, filed Dec. 13, 2019, all of which is incorporated herein by reference in its entirety.

TECHNICAL FIELD

The present application generally relates to online account optimization by reducing account churn rate, and more specifically to intelligent lifecycle monitoring of digital accounts using collaborative filtering to identify similarities between user vectors.

BACKGROUND

Multiple types of online entities may provide accounts for users, including transaction processors, messaging services including email and instant messaging services, social networking platforms, and/or media sharing platforms. Use of these services may require a user to generate and utilize an account with the service provider. For example, transaction processors may provide accounts to different types of users, including consumers, merchants, and other types of buyers or sellers. However, over time users may use their account less and less or may stop using their account to utilize a similar but different transaction processor. This account abandonment or attrition may occur as the user is unaware of particular services of the service provider/transaction processor or is unable to access those services. Often the entities provide such features, but users may not be integrated enough to utilize all those services. Moreover, unused accounts cause unnecessary data storage, which adversely impacts database systems of the service provider. Thus, the service providers may wish to reduce churn rate, or the amount or percentage of lost customers that discontinue use of their account. Without an intelligent engine to identify similarities between users, the service provider may be unable to reduce this churn rate.

BRIEF DESCRIPTION OF THE DRAWINGS

FIG. 2B is an exemplary matrix of service subcategories of a service provider having correlated users used to generate vectors for identification of churn scores with the service provider;

Figure 1:
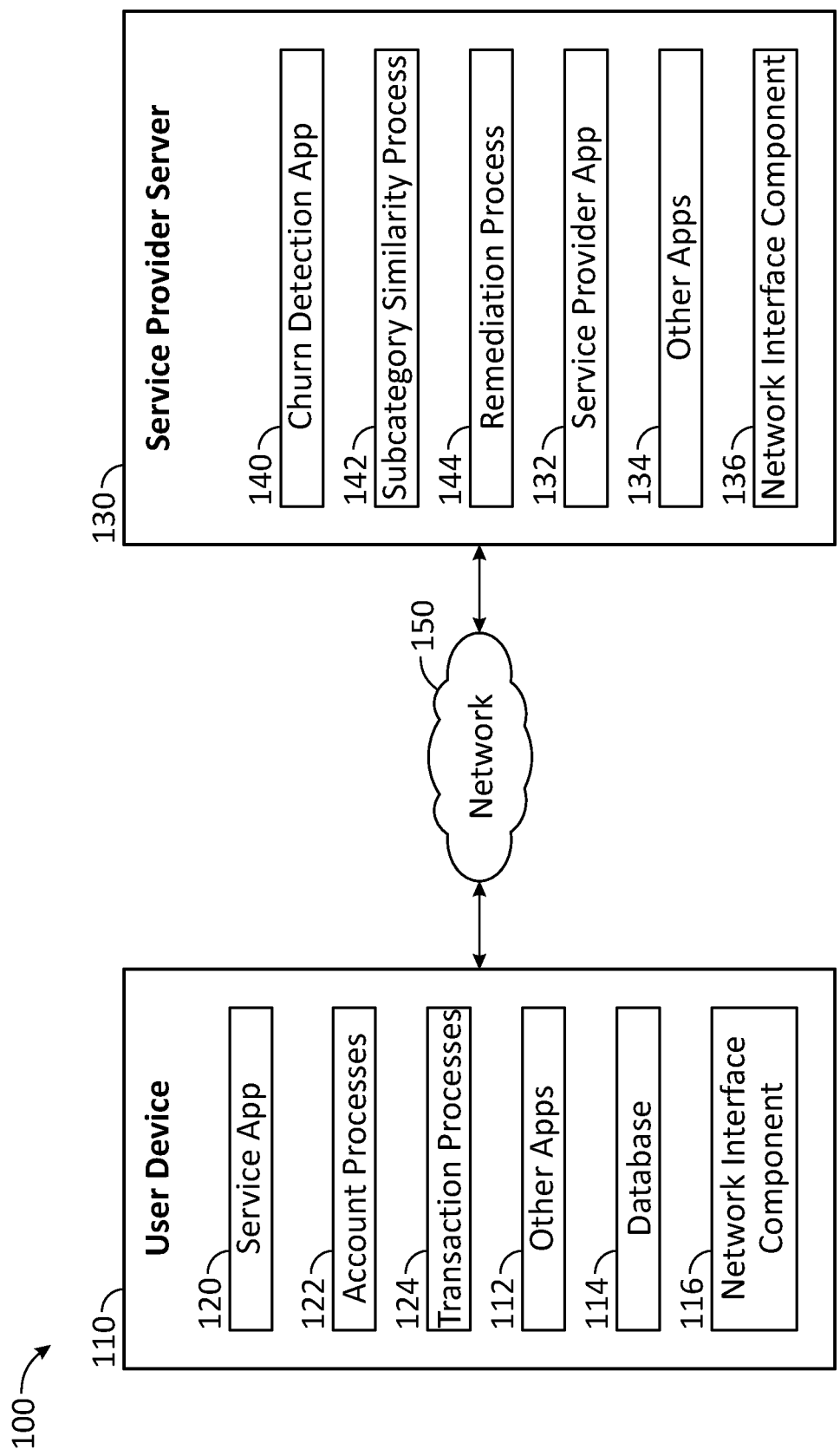
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for reducing account churn rate through intelligent collaborative filtering. Systems suitable for practicing methods of the present disclosure are also provided.

According to various embodiments, a user may establish an account with a service provider, where the account allows the user to utilize various services provided by the service provider, including transaction processing services, messaging services, social networking services, media sharing services, email services, and/or other type of online activity provided by the services of the service provider. The service provider may provide lifecycle monitoring of the account, for example, to reduce churn rate and account abandonment through the use of collaborative filtering and remediation actions that allow for comparison to other past users. Churn rate describes the rate or percentage of users that discontinue use of a service provider (which includes a time to leaving the service provider by these users), such as by leaving the service provider, abandoned or closed their account, or otherwise stopping use of the service provider's services. Thus, churn rate describes the attrition rate of accounts and customer users (e.g., merchants, consumers, and other payers/payees) with a service provider, such as one that provides electronic transaction processing services. Note that as used herein in different embodiments, churn, attrition, or abandonment of an account does not require complete abandonment of use, but can include a significant reduction in use, which can be relative based on historic usages, such that even if a user is still using the service provider, e.g., for one or two transactions a year, where historically, the user was conducting 50-100 transactions per year, the user is deemed to have churned. In some embodiments, reduction of use beyond a certain threshold results in a determination of potential abandonment that triggers the actions described herein.

To determine whether a current or present user may leave the service provider, one or more matrices may be generated for the past users that correlate the subcategorizations for each of these past users of the service provider. Using the matrices, the present user of the service provider may be matched to one or more past users, which may indicate whether the user is likely to churn or greatly reduce use of the service provider. For example, a vector of the user's subcategories may be compared to vectors from rows of the matrices corresponding to a particular subcategorization and past users having similar matching subcategorizations to determine similarities of the current user to past users and whether the current user's particular subcategorizations indicate the user is likely to leave the service provider. If such analysis indicates that the user may potentially leave, the service provider may provide one or more remediation actions or notifications that attempt to retain the current user by the service provider. In this regard, the remediation action may correspond to an account action take with respect to the user's account, which may include addition of a feature, advertisement for the feature, removal of the feature, policy update, fee or cost changes or updates, newly added feature information, and/or removal of a past available feature.

In order to establish an account, a user may be required to provide information to a service provider to generate the account. With regard to a service provider offering transaction processing services, one or more users may wish to engage in electronic transaction processing with one or more other entities, such as merchants or other users. Thus, the users of a transaction processor may correspond to both merchants and consumers. Various service providers may provide transaction processing services that may allow two or more entities (e.g., personal users, groups of users, merchants, etc.) to engage in electronic processing for a transaction. These service providers may further provide the aforementioned account services, which may be utilized through various services provided by the service provider. In order to establish the account, the user may be required to provide personal, business, or other identification information, such as a name, address, social security number, driver's license, and/or other information. The user may also be required to provide financial information, including payment cards (e.g., credit/debit cards), bank account information, gift cards, and/or benefits/incentives, which may be utilized to provide payments or otherwise engage in processing of another transaction. In order to create an account, the user may be required to select an account name and/or provide authentication credentials, such as a password, personal identification number (PIN), security questions, and/or other authentication information. The service provider may create the account and may store the financial instruments of the user and allow the user to process transactions. In some embodiments, the service provider may provide a digital token, such as a data package, that represents a digital wallet for the account and may approve the digital wallet for processing of a transaction with the service provider to a device that receives the token. Thus, the token may include data identifying the digital wallet (e.g., a token), as well as authentication information including an identifier for user of the digital wallet, which may be encrypted.

Once an account is created, the account may be accessed through a web browser from a website of the service provider and/or a dedicated application of the service provider, such as a mobile smart phone application. Thus, the user may directly access the account through an electronic communication channel, for example, through sending data to and receiving data from the service provider through a web browser/dedicated application over a network connection with the service provider. However, the service provider may utilize other communication mediums, including website banners, emails, text messaging, social networking feeds, etc. The user may engage in transaction processing through accessing their account and providing transaction information for the transaction. This may generate account data, including those service subcategories of services used by the user of the service provider and other subcategorizations of the user with the service provider. For example, the user's account may have utilized a chartered accountant or an account manager. Similarly, the user may fall into particular subcategorizations, such as a country of origin, a buyer/seller age, or a seller segment or industry type. Thus, the accounts may store information associated with the account's usage with the service provider.

In this regard, the service provider may implement an intelligent system including a collaborative filtering engine for determination of whether a current account and/or user of the service provider may leave the service provider or otherwise abandon or close their account. To provide these services, the service provider may first generate collaborative filtering data and tools used to analyze the current users of the service provider. The service provider may determine multiple service subcategories for the services provided to the users of the service provider, as well as subcategorizations of the users based on these subcategories. For example, with regard to merchants (e.g., as users of the service provider), a service subcategory may correspond to some parameter defining a particular service offered by the service provider, including but not limited to use of a chartered accountant service, a loan service, a placement consultancy service, a website service, a coaching service, or a tutoring service. Similarly, these may also correspond to a parameter defining the merchant, including but not limited to a merchant age, a merchant country, a total payment volume, a number of chargebacks with the merchant, a type of the chargebacks, a time until arrival of the chargebacks, a funding source, a cross-border merchant, a merchant size, an industry type, merchant protection service, a merchant response, a merchant industry, or a bank status. These subcategories or subcategorizations therefore include a parameter defining a user account with a service provider.

Using the subcategories, matrices may be generated that correlate the past users of the service provider. Each row and column of a single matrix may correspond to a single subcategory (or "subcat") such that a cell corresponds to a subcat-subcat correlation, such as chartered accountant usage subcat to a loan usage subcat. Additionally, those accounts sharing both those features or usage of the subcat may be tallied and placed into each corresponding cell. For example, the chartered accountant-loan cell may include 2 users with a chartered accountant-placement consultancies cell may include 23 users having accounts that share both these subcategories. Matrixes may be made having a certain number and/or a certain selection of the subcategories so that different samples of past users that have left the service provider may be determined. Additionally, the user model for these past users may be based on additional information, including user or merchant information, demographic features, account usage amounts and information, user online behavior (e.g., search engine searches, browsing, online transaction processing, etc.), real-world detected information (e.g., visited locations, processed transactions and purchases, detected biometrics, etc.), account information for the account, and/or user information for the user. The information for the matrices may also utilize a time of enrollment in the account, amount of usage of the account, sophistication of the account usage, number of adopted features, and/or length since last use of the account. For other types of accounts, other information may be used for the matrices including viewed media sources, a rate of response, click-through, or other effectiveness measurement for data, messaging services used, social networking parameter and usage rates (including number of friends and rate of friend accrual), and the like.

Once the matrices have been generated, the service provider's intelligent correlation engine may then utilize the matrices to compare to current users. For example, a user's subcategories may be compared to each of the subcategories for a row of the matrix. A subcat-subcat similarity measurement may be determined based on the Euclidean distance between each pair of the subcategories, which may be represented in vector space between different points. A Pearson correlation may also be used as another process for finding similar subcategories and identifying similar users, where a Pearson correlation score may be used to generate the Pearson correlation coefficient for the subcat-subcat pairs. Thereafter this may be compared to the current user to determine a n number of similar subcategories to the user, where n may be user defined or available based on the matrix or matrices used for evaluation. In some embodiments, cosine similarity may be used to compare vectors for particular users. For example, a user vector or other measure of the user's subcategories may be generated based on the user's information, such as merchant and/or account information for a merchant. This vector may be compared to vectors generated for each row of a specific matrix that quantifies the past users that have left the service provider and provider vectors for those merchants having particular subcategories from the service provider. Cosine similarity may find similar users based on an angular distance (e.g., the inner product space between two vectors) between the current user and one or more past users.

Using the comparison model, a predicted churn score, or a time until leaving the service provider, may be determined for the current user by comparing the current user to the past users. Therefore, the predicted churn score can be used as a measure of the potential attrition of the current user (e.g., likelihood that the current user leaves the service provider's services, accounts, or other ecosystem). Additionally, a remediation engine of the service provider may analyze this information to determine a predicted reason that the current user may churn. For example, one or more reasons for churn of one or more past users may be determined. These reasons may correspond to placement in certain subcategories (e.g., high risk, cross-border account, etc.), or subcategories that the current user does not fall into (e.g., failure to use account protection services, low risk account, etc.). The remediation may determine these particular reasons based on soliciting the past user (e.g., through account closing surveys and the like), whether an administrator has entered a reason, or predicting the reason(s) based on past users' subcat-subcat correlations.

In order to prevent the current user from leaving and reduce churn rate, the service provider may generate a remediation strategy, including an action and/or notification to reduce the likelihood of the current user leaving. For example, where the current user corresponds to a merchant and/or merchant account of the service provider, the service provider may provide multiple different features, such as a free return policy, a delivery feature, an extendable credit, and/or a simplified checkout and payment processes. For merchants this may also include one of onboarding the account with a seller protection service, voiding or refunding a chargeback, placing a reserve on the account, placing the account in a risk management program, providing credit to the account, lessening a limitation on the account, or lowering a fee imposed on the account. This may also include a notification with an offer to upgrade a service of the service provider that is used by the merchant, an offer to reduce a fee or a penalty imposed on the merchant for the service or reversing a previous cost of the merchant with the service provider.

Where the current user may correspond to a consumer or a buyer, the process may include a free shipping policy, credit features, and/or a "one-touch" process that keeps the consumer logged in to the service provider through a device side cookie or other device stored data. This may allow the consumer to instantly purchase through websites and applications. The features may include reduction in account penalties or fees, which may also require fees or may be free to implement. The notification of the remediation offer may also include an advertisement to the current user. Once the remediation action or notification is generated, the service provider may transmit the notification to the current user through a communication channel, which may be determined based on the current user's actions and/or account data. For example, statistical analysis of the past and present users may be used to determine a highest effectiveness rate of communication to the users, including email, messaging, banners within a website or dedicated application for the service provider, external webpage or application advertisement/notification for an entity other than the service provider, login webpage notifications, checkout or transaction processing webpage notifications, social networking feed, or other communication channel.

In this manner, a service provider may utilize collaborative filtering to decrease churn rate. Collaborative filtering may therefore allow for identifying correlations between subcategory pairs so that subcat-subcat pairs may allow for comparison between past users to current users based on similar vectors. This allows for identification of the likelihood, and time until, the current users may leave a system, thereby allowing a remediation action to be taken or notification to be transmitted to the current user.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user device 110 and a service provider server 130 in communication over a network 150. A user (not shown) may utilize user device 110 to utilize the various features available for user device 110, which may include processes and/or applications that may interact with services provided by service provider server 130 to utilize an account with service provider server 130. Service provider server 130 may provide a process to determine a churn score for a current user (e.g., a consumer, merchant, or other user of service provider server 130), such as a predicted probability and time until a user leaves service provider server 130. In this regard, analysis of subcat-subcat correlations and pairs may be used to determine whether is a current user is similar to one or more past users and determine a churn score for the current user. Service provider server 130 may then generate a remediation strategy to retain the user.

Client device 110 and service provider server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Client device 110 may be implemented as a computing or communication device that may utilize appropriate hardware and software configured for wired and/or wireless communication with service provider server 130, which may include personal and mobile computing devices of individual and/or groups of customers of service provider server 130, such as single users, merchants, and/or other entities. For example, in one embodiment, client device 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

Client device 110 of FIG. 1 contains a service application 120, other applications 112, a database 114, and a network interface component 116. Service application 120 and other applications 112 may correspond to executable processes, procedures, and/or applications with associated hardware. In other embodiments, client device 110 may include additional or different modules having specialized hardware and/or software as required.

Service application 120 may correspond to one or more processes to execute modules and associated components of client device 110 to interact with a service provider or other online entity that may provide account services to utilizes the resources and services of that service provider, such as service provider server 130. In this regard, service application 120 may correspond to specialized hardware and/or software utilized by client device 110 to establish an account and utilize the account. Service application 120 may be used to an access an account, such as by providing user personal and/or financial information, setting authentication information, queries, and challenges, and maintaining the account by providing other necessary information, accessing the account, and utilizing the account. In this regard, with a transaction processor system, service application 120 may be used, during electronic transaction processing, to utilize user financial information, such as credit card data, bank account data, or other funding source data, as a payment instrument when providing payment information, including an account for electronic transaction processing of a transaction. For example, service application 120 may utilize a digital wallet associated with the account as the payment instrument, for example, through accessing a digital wallet or account of a user through entry of authentication credentials and/or by providing a data token that allows for processing using the account. Service application 120 may also be used to receive a receipt or other information based on transaction processing. Service application 120 may correspond to a general browser application configured to retrieve, present, and communicate information over the Internet (e.g., utilize resources on the World Wide Web) or a private network. For example, service application 120 may provide a web browser, which may send and receive information over network 150, including retrieving website information, presenting the website information to the user, and/or communicating information to the website. However, in other embodiments, service application 120 may include a dedicated application of service provider server 120 or other entity (e.g., payment provider, etc.), which may be configured to provide services through the application.

Service application 120 may therefore be used to utilize account and service provider services provided through account processes 122 and transaction processes 124. In this regard, while utilizing an account, the account may be limited to the merchant, consumer, or other user, or that user may be unaware of particular services provided by service provider server 120. Thus, the user may stop using the account, use the account less, or otherwise add to account attrition with service provider server 130 where the user's account is considered abandoned, canceled, or otherwise no longer a customer of service provider server 130. In order to determine when and how likely this is to happen, service provider server 130 may determine a predicted churn score, or time and likelihood to leaving the account or stopping use of the account by the user. This may be based on collaborative filtering, as discussed herein, to identify other similar past users that have left use of their accounts with service provider server 130. Service provider server 130 may then provide one or more remediation items, as discussed herein, where service application 120 may receive new processes, updates, account upgrades, and/or notifications that alerts the user of other measures service provider server 130 may take to retain the user and user's account as active. For example, the remediation action may provide changes, benefits, or other processes for the account that may be utilized through account processes 122 and transaction processes 124 of service application 120. Thus, service application 120 may be used to receive services, rewards, benefits, and/or notifications to prevent the user's account from becoming inactive and increase account attrition of the service provider.

In various embodiments, client device 110 also includes other applications 112 as may be desired in particular embodiments to provide features to client device 110. For example, other applications 112 may include security applications for implementing client-side security features, programmatic client applications for interfacing with appropriate application programming interfaces (APIs) over network 150, or other types of applications. Other applications 112 may also include additional communication applications, such as email, texting, voice, social networking, and IM applications that allow a user to send and receive emails, calls, texts, and other notifications through network 150. Other applications 112 may be utilized with service application 120 to utilize an account, such as other platforms where an account of the user of user device 110 with service provider server 130 may be utilized (e.g., other merchant and/or marketplace sale and purchasing applications). Other applications 112 may include device interfaces and other display modules that may receive input and/or output information. For example, other applications 112 may contain software programs, executable by a processor, including a graphical user interface (GUI) configured to provide an interface to the user.

Client device 110 may further include database 114 stored in a transitory and/or non-transitory memory of client device 110, which may store various applications and data and be utilized during execution of various modules of client device 110. Thus, database 114 may include, for example, identifiers (IDs) such as operating system registry entries, cookies associated with voice data application 120 and/or other applications 112, IDs associated with hardware of client device 110, or other appropriate IDs, such as IDs used for payment account/user/device authentication or identification. Database 114 may further include account information, as well as remediation items and offers for accounts.

Client device 110 includes at least one network interface component 116 adapted to communicate with service provider server 130. In various embodiments, network interface component 116 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. User device 110 may also communicate directly with nearby devices using short range communications, such as Bluetooth Low Energy, LTE Direct, Wi-Fi, radio frequency, infrared, Bluetooth, and near field communications.

Service provider server 130 may be maintained, for example, by an online service provider, which may provide account features to users through implemented services of service provider server 130, including those account features associated with electronic transaction processing using an account In this regard, service provider server 130 includes one or more processing applications which may be configured to interact with client device 110 and/or another device/server to facilitate application testing. In one example, service provider server 130 may be provided by PayPal®, Inc. of San Jose, CA, USA. However, in other embodiments, service provider server 130 may be maintained by or include another type of service provider, which may provide the aforementioned services to a plurality of users.

Service provider server 130 of FIG. 1 includes a churn detection application 140, a service provider application 132, other applications 134, a database 136, and a network interface component 138. Churn detection application 140, service provider application 132, and other applications 134 may correspond to executable processes, procedures, and/or applications with associated hardware. In other embodiments, service provider server 130 may include additional or different modules having specialized hardware and/or software as required.

Churn detection application 140 may correspond to one or more processes to execute software modules and associated specialized hardware of service provider server 130 to perform churn score comparison for one or more active accounts of service provider server 132, where the accounts may be generated and utilized through interactions between user device 110 and service provider server 132. In this regard, churn detection application 140 may correspond to specialized hardware and/or software to determine a churn score and remediation process for active or current accounts with the potential to go inactive, close, be abandoned, or otherwise add to an account attrition number or rate with service provider server based on the churn score. Subcategory similarity process 142 may be used to determine when an active account indicates the potential to become inactive based on one or more churn scores of similar accounts. For example, subcategory similarity process 142 may provide a process to detect if an account potentially may become inactive and the potential for attrition of the account. This may be done by comparison of service, user, and/or account subcategories of those previous accounts that left the service provider or otherwise became inactive, including generating matrices to identify subcat-subcat similarities and generating vectors for previous accounts to compare to vectors generated from current accounts.

For example, the used subcategories may correspond to a chartered accountant service, a loan service, a placement consultancy service, a website service, a coaching service, a tutoring service, a user age, a user country, a total payment volume, a number of chargebacks with the user, a type of the chargebacks, a time until arrival of the chargebacks, a funding source, a cross-border user/merchant, a user/merchant size, an industry type, user protection service, a user response, a user industry, or a bank status. Other subcategories may also be utilized by subcategory similarity process 142, such as those associated with customers and customer identities of a merchant's customers, flow of money or products between countries, transaction creation and/or closing dates, average transaction amount, courier or shipping company used, mode of payments include pay after delivery and the like, buyer/seller countries and/or regions, guest user checkout, customer account type, account types (business versus personal, or other tiered level accounts), merchant or buyer size, buyer/seller funds sent and/or received prior to or after one or more transactions, account signup date, buyer/seller account verification, merchant marketplace user, device used by buyers/sellers, and/or other parameter.

Using the subcategories, matrices may be generated that correlate the past users of the service provider by subcategory similarity process 142. These matrices may be utilized to determine subcat-subcat similarities through one or more of Euclidean distance and/or Pearson Similarity. Thus, subcategory similarity process 142 may be used to determine a number of similar subcategories for a given subcategory entered as input. The processes for subcat-subcat similarity detection through vector comparison is further described with regard to FIGS. 2A and 2B below. User vectors may be generated using the rows of the matrices and the subcat-subcat similarities, which may be compared to a vector generated for the present user based on the subcategories of the present user, for example, using cosine similarity or other process to compare vectors generated for user. For example, cosine similarity may estimate closeness of vectors based on a measure of similarity between those vectors. In this regard, this corresponds to the inner product space between two different angular vectors. Where two vectors are the same vectors (or point in the same direction), their similarity would be 1. Two perpendicular vectors would have a similarity score of 0, and those diametrically opposed would have a similarity score of −1. The similarity score between user based on their vectors may therefore be calculated in a similar manner, with those similar users have as close to a value of 1 being the most similar users for determination of a similarity score.

Thus, past users may be compared to one or more present users, such as merchants who have left service provider server 130 to current merchants of service provider server 130, and a churn score for each current user may be predicted. Based on the churn score, churn detection application may then execute remediation process 144 to determine a remediation strategy for the current user(s). Remediation process 144 may then provide one or more processes to attempt to retain the current users that have churn score(s) indicating a high potential for account inactivity, abandonment, closing, or attrition, and a potential time until that attrition. Remediation process 144 may provide one or more processes to retain the account, for example, by transmitting a notification to the account or providing a service to the account. The remediation strategy may include both notification and service provision to the account, and may further involve one or more external parties, such as account managers to reduce the potential for attrition of the account.

Utilizing past users, the subcat-subcat comparisons and correlations, and other data, a reason for the potential attrition may be determined for various churn rates and/or scores, which may be used to tailor the remediation strategy. This may include emailing or messaging the user including using an account manager for querying the user, onboarding the account with a seller protection service, placing a reserve on the account where too many chargebacks may indicate issues with account usage and satisfaction, providing credit programs to the account, releasing funds or placing into risk programs for funds, voiding or refunding a chargeback, providing credit to the account, lessening a limitation on the account, upselling an account product, or lowering a fee imposed on the account. This may also include a notification with an offer to upgrade a service of the service provider that is used by the user, an offer to reduce a fee or a penalty imposed on the user for a service or reversing a previous cost to the account.

Service provider application 132 may correspond to one or more processes to execute modules and associated specialized hardware of transaction processor 130 to provide account services to users, where the accounts may be used to process a transaction for a user or otherwise provide account services. In this regard, service provider application 132 may correspond to specialized hardware and/or software used by a user associated with user device 110 to establish an account with service provider application 132 by providing personal and/or financial information to transaction processor 130 and selecting authentication credentials. For example, in order to establish an account of to utilize services and interact with other entities, service provider application 132 may receive information requesting establishment of the account. The information may include user personal, business, and/or financial information. Additionally, the information may include a login, account name, password, PIN, or other account creation information. The entity establishing the account may provide a name, address, social security number, or other personal or business information necessary to establish the account and/or effectuate payments through the account. Service provider application 132 may further use the account to provide services to users, for example though an account that may be established using service provider server 130. The services may allow for a payment through a payment instrument using one of accounts 142, or may correspond to other services, including messaging, email, social networking, microblogging, media sharing and viewing, or other types of online interactions and services. The account may be used to send and receive payments. The payment account may be accessed and/or used through a browser application and/or dedicated payment application executed by user device 110.

In various embodiments, service provider server 130 includes other applications 134 as may be desired in particular embodiments to provide features to service provider server 130. For example, other applications 134 may include security applications for implementing server-side security features, programmatic client applications for interfacing with appropriate application programming interfaces (APIs) over network 150, or other types of applications. Other applications 134 may contain software programs, executable by a processor, including a graphical user interface (GUI), configured to provide an interface to the user when accessing service provider server 130, where the user or other users may interact with the GUI to more easily view and communicate information. In various embodiments, other applications 134 may include connection and/or communication applications, which may be utilized to communicate information to over network 150.

Additionally, service provider server 130 includes database 136. As previously discussed, a user may establish one or more digital wallets and/or payment accounts with service provider server 130. Digital wallets and/or payment accounts in database 136 may include user information, such as name, address, birth date, payment instruments/funding sources, additional user financial information, user preferences, and/or other desired user data. Users may link to their respective digital wallets and/or payment accounts through an account, user, and/or device identifier. Thus, when an identifier is transmitted to service provider server 130, e.g., from client device 110, one or more digital wallets and/or payment accounts belonging to the users may be found. Database 136 may also store matrices and subcat-subcat correlations and similarities, which may be used in vector determination and comparison for churn scores of accounts.

In various embodiments, service provider server 130 includes at least one network interface component 138 adapted to communicate client device 110, and/or other devices/servers over network 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2A:
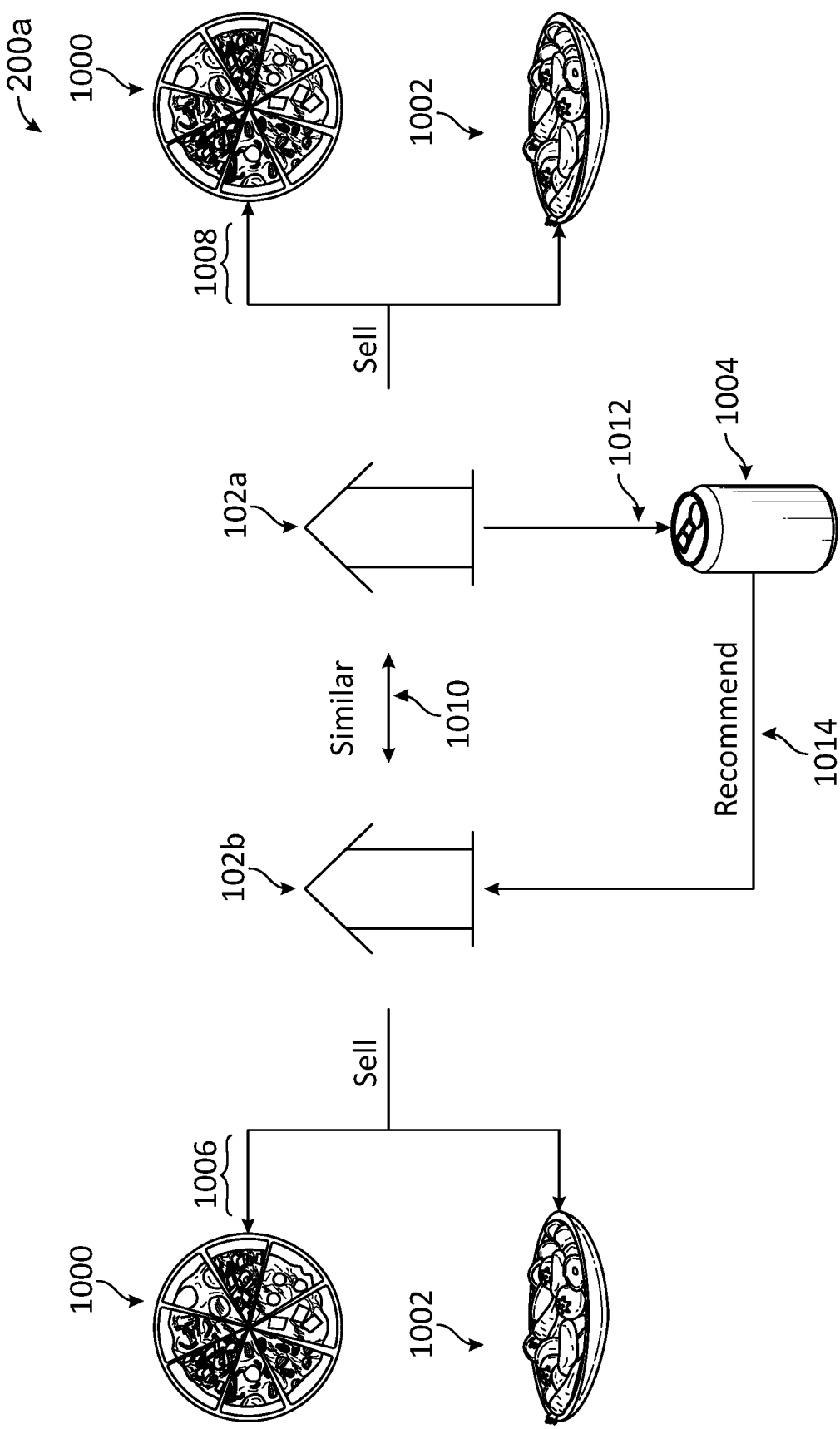
FIG. 2A is an exemplary environment showing different users having recommendation made based on collaborative filtering, according to an embodiment.

FIG. 2A is an exemplary environment showing different users having recommendations made based on collaborative filtering, according to an embodiment. In environment 200a, users (e.g., merchants) are shown where their various preferences, purchase or sales, and/or categorizations (including subcategorizations the users may fall into with a service provider), may be utilized to generate recommendations or associations between certain users (e.g., other merchants). For example, collaborative filtering allows for determining similarities between different users based on information about the user's behaviors, activities, or preferences, such as those subcategories that users and/or accounts fall into with a service provider (e.g., service provider server 130). These users may also correspond to other types of customers of a service provider, including consumers. Where the users correspond to merchants in environment 200a, a merchant 102a and a merchant 102b may have various interests in items, such as previous purchases of items. Merchant 102a and merchant 102b are both shown as selling pizza 1000 and salad 1002 as merchant 102a has previous sales 1006 for pizza 1000 and salad 1002, while merchant 102b has also previous sales 1008 for pizza 1000 and salad 1002.

Utilizing purchases 1006 and 1008, a similarity may be determined between merchant 102a and merchant 102b. This similarity may be calculated utilizing one or more of the filtering and comparison techniques described herein. For example, pizza and salad similarities may be calculated and vectors for merchant 102a and 102b compared based on such similarities. Utilizing this comparison between users and/or user vectors, a number of similar items may then be proposed to merchant 102b from merchant 102a. For example, merchant 102a further performs sales 1012 of a soda 1004. Since merchant 102a and 102b are considered to be similar based on comparison between those users, recommendation 1014 may recommend soda 1004 as an item of potential interest to merchant 102b for sales based on collaborative filtering mechanisms to identify similar users and items of interest to users without requiring knowledge (e.g., identifiers, keywords, interests, etc.) of the items and/or users specifically and performing content based recommendations. Processes for correlating users are discussed in more detail with regard to FIG. 2B.

FIG. 2B is an exemplary matrix of service subcategories of a service provider having correlated users used to generate vectors for identification of churn scores with the service provider. Environment 200b includes a table 1100 that displays subcategories organized into a matrix, where the matrix allows viewing of various subcat-subcat pairs for each cell. In this regard, the columns are formed into subcategories 1102a, 1104a, 1106a, 1108a, and 1110a, whereas the rows are formed to categories 1102b, 1104b, 1106b, 1108b, and 1110b. 1102a-b, 1104a-b, 1106a-b, 1108a-b, and 1110a-b each correspond to the same subcategory, respectively, "Chartered Accountant," "Loans," "Placement Consultancies," "Coaching and Tuitions," and "Website Services." For 1102a-b, 1104a-b, 1106a-b, 1108a-b, and 1110a-b, each user, such as a merchant, that uses services in those corresponding subcategories are added to the corresponding cell of the matrix. Although FIG. 2B is described in reference to merchants and merchant subcategories of a service provider, other users of a service provider may similarly be categorized in similar matrices based on their subcategories.

For subcategory 1102b, the number of users also using services within subcategory 1106a is shown as 23. Similarly, for subcategory 1108b, the number of users also using services in subcategory 1104a corresponds to one user. Thus, each cell represents a subcat-subcat correlation. Those accounts sharing both those features or usage of the subcat-subcat cell may be tallied and placed into each corresponding cell. Other matrices may be made having a certain number and/or a certain selection of the subcategories so that different samples of past users or merchants may be organized to view their specific subcat-subcat similarities. Once the matrices have been generated, the service provider may analyze current users, such as current merchants having active accounts, to determine the predicted churn score for those merchants and provide a remediation or retention strategy to retain those merchants and accounts as active for the service provider. For example, a current user's subcategories may be compared to each of the subcategories for a row of the matrix. In table 1100 of environment 200b, each row is labeled, having rows 1112, 1114, 1116, 1118, and 1120. In order to perform matching of past merchants to current merchants to predict a potential for churn or attrition of current merchants, subcat-subcat similarity measurements may be calculated using one or more of the Euclidean distance between each pair of the subcategories or a Pearson correlation score where a Pearson correlation coefficient for the subcat-subcat pairs may be calculated. One potential formula for calculating the Pearson correlation coefficient r between plotted subcat-subcat similarities is as follows: $S_{xx}=\Sigma x^2-(\Sigma x)^2/n$, $S_{yy}=\Sigma y^2-(\Sigma y)^2/n$, $S_{xy}=\Sigma xy-(\Sigma x)(\Sigma y)/n$, $r=S_{xy}/sqrt(S_{xx}S_{yy})$. Thereafter this may be compared to the current user to determine a n number of similar subcategories to the user, where n may be user defined or available based on the matrix or matrices used for evaluation. In some embodiments, cosine similarity may be used to compare vectors for particular users. A user vector or other measure of the user's subcategories may be generated based on the user's information, such as merchant and/or account information for a merchant. This vector may be compared to vectors generated for each row, such as rows 1112, 1114, 1116, 1118, and 1120 of table 1100 to identify similar subcategories and past merchants to a current user. Once identified, the service provider may provide remediation strategies to attempt to retain the user with the service provider.

Figure 3:
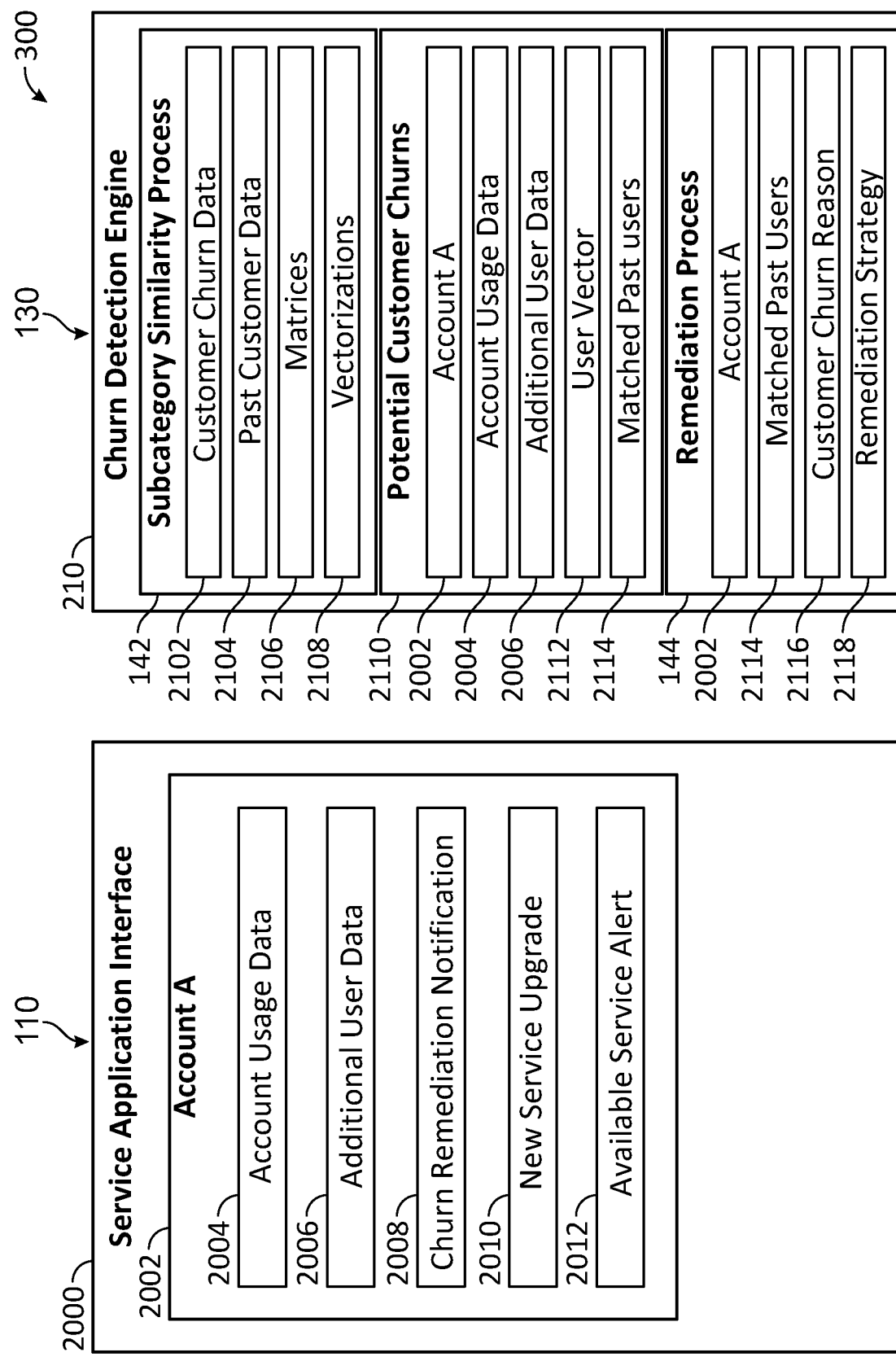
FIG. 3 is an exemplary system environment showing a user device and a service provider server interacting to reduce churn rate of users with a service provider based on collaborative filter, according to an embodiment.

FIG. 3 is an exemplary system environment showing a user device and a service provider server interacting to reduce churn rate of users with a service provider based on collaborative filter, according to an embodiment. Environment 300 includes user device 110 and service provider server 130 discussed in reference to system 100 of FIG. 1. Thus, client device 110 and service provider server 130 interact to determine a predicted churn score for an account and provide remediation steps to avoid account loss. This may then be utilized to perform a process for account retention based on predicted churn scores, as discussed in reference to FIG. 4.

Client device 110 displays a service application interface 2000 corresponding generally to an application interface that may be displayed by an application while utilizing an account provided by service provider server 130, for example, using service application 120 in system 100. In this regard, service application interface 2000 may allow a current user to utilize an account A 2002 to perform various actions and activities, including electronic transaction processing by merchants or consumers. Thus, account A 2002 may be associated with account usage data 2004 that indicates how the account was used, how often the account was used, and other parameters that may be used to perform subcategorizations of the account for churn score determination. Account A 2002 may also be associated with additional user data, such as merchant or consumer information, device locations and device types, additional device applications, and other data used for those subcategorizations of the account.

Service provider server 130 therefore provides a churn detection application 140, which may be used to determine a predicted churn score for an account and provide remediation steps to prevent account and/or customer loss due to attrition. For example, in environment 300, churn detection application 140 may utilize a subcategory similarity process 142 to determine whether a current account may add to a churn rate or attrition rate of service provider server 130, such as by becoming a lost account or customer of service provider server 130. Therefore, subcategory similarity process 142 processes customer churn data 2102 to identify subcategorizations of past users of service provider server 130 and/or other services providers, such as those accounts that have left their account, closed that account, or otherwise caused the account to become inactive. In some embodiments, this may include pulling account data from multiple different platforms. Using customer churn data 2102, matrices 2106 may be generated, which correspond to the number of past users and/or accounts that fall into one or more subcat-subcat categorizations. Further subcat-subcat similarities may be determined based on vectorizations 2108 and other similarity calculations, such as based on the rows of matrices 2106, that may be generated using Euclidean distance, Pearson correlation coefficients, and/or cosine similarity.

Using customer churn data 2102, potential customer churns 2110 may be determined for current customers, such as users, merchants, consumers, etc., of the service provider. Account A 2002 may be compared to past accounts based on the subcat-subcat similarities of matching subcategories and therefore past accounts. This may be based on account usage data 2004 and additional user data 2006 to generate a user vector 2112 and therefore matches past uses 2114 through comparison to matrices 2106 using vectorizations 2108. In response to these potential customer churns 2110, a remediation process 144 may analyze account A 2002, matched past users 2114, and/or other data to determine a customer churn reason 2116. Customer churn reason 2116 may correspond to a predicted or potential reason that the current user may leave the service provider and be a potential attrition. Further, customer churn reason 2116 may be used to generate a remediation strategy 2118 that can be used to propose new services, notifications, and/or assistance to the current user's account to prevent the attrition of that account.

Figure 4:
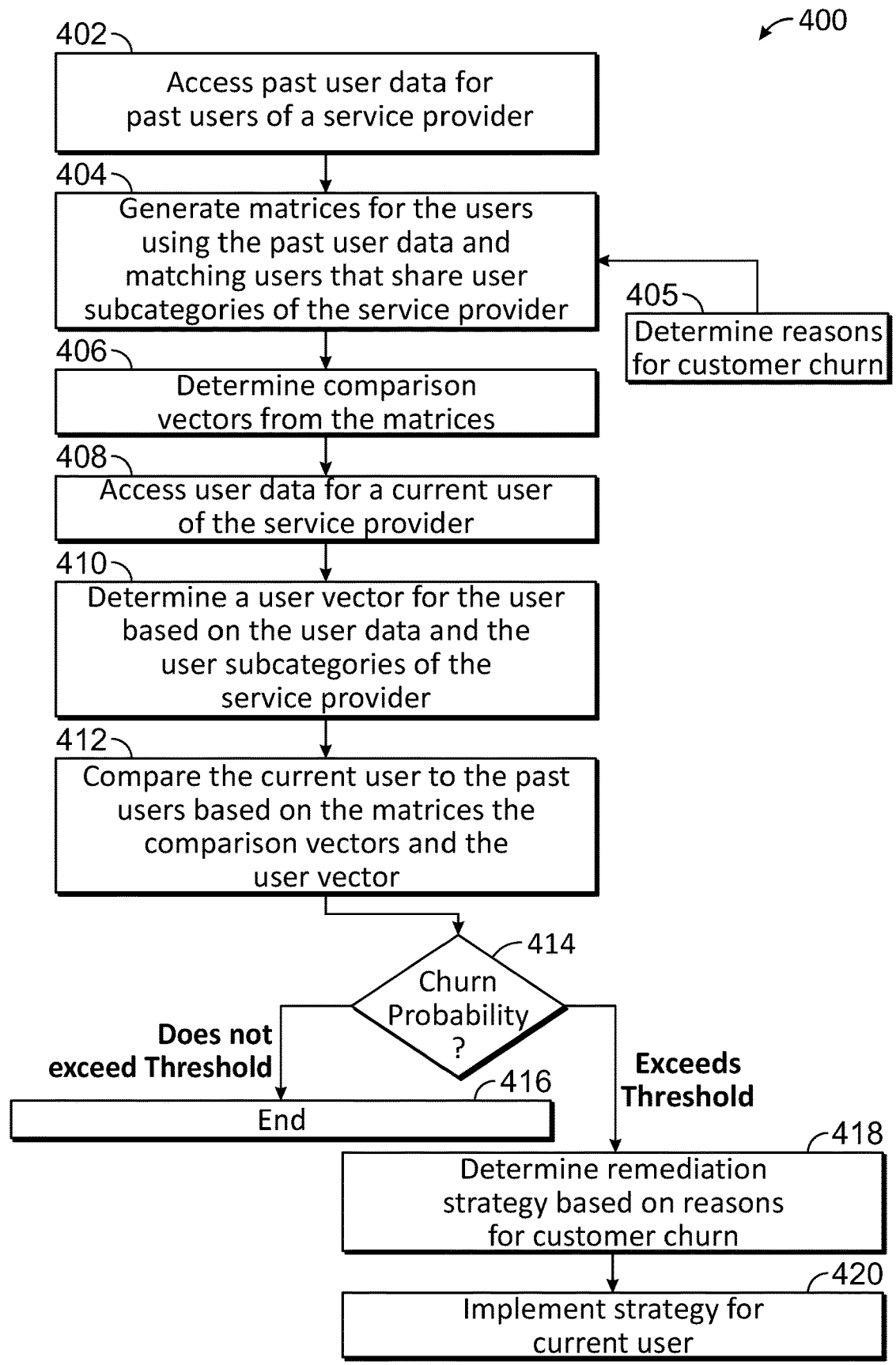
FIG. 4 is a flowchart of an exemplary process for reducing account churn rate through intelligent collaborative filtering, according to an embodiment.

FIG. 4 is a flowchart of an exemplary process for reducing account churn rate through intelligent collaborative filtering, according to an embodiment. Note that one or more steps, processes, and methods described herein of flowchart 400 may be omitted, performed in a different sequence, or combined as desired or appropriate.

At step 402 of flowchart 400, past user data for past users of a service provider is accessed, where the past users may correspond to merchants or consumers that may have left the service provider or otherwise led to account or customer attrition. Thus, this past user data is indicative of churn rates for the service provider, where churn rates indicate a time to and number of users that were part of the customer attrition for one or more accounts, users, or types of users (e.g., merchants, consumers, etc.). This past user data may include subcategories of the past users that are associated with particular services utilized by the users, as well as classifications and parameters of these users (e.g., location, company/merchant size, industry, etc.). A machine learning model may be trained to determine a churn score for a particular current user or current user account using this past user data, such as the subcategories that the users may fall into. This allows for intelligent detection of current users that may churn and therefore leave the service provider. To train the model, one or more matrices are generated for the past users using the past user data and matching users that share user subcategories of the service provider, at step 404. Thus, the matrices may therefore include subcat-subcat correlations, such as a number of users sharing subcategories, within each cell of the matrices. Number and type of the subcategories may be determined randomly or as needed for specific matrices and churn score analysis.

Comparison vectors are then determined for the matrices, at step 406 of flowchart 400, where the comparison vectors are used to determine matching current users and estimate a churn score for those current users. For example, each row of the matrices may correspond to a vector for a particular subcategory based on the corresponding subcat-subcat correlations, where those correlations may further be analyzed using Euclidean distance, Pearson correlation, and/or cosine similarity to generate the vectors. At step 408, user data for a current user of the service provider is accessed, where the user data may correspond to the current subcategories of that current user, such as services used, user information, and the like. A current user vector or other analysis tool may be determined for the current user based on the current user data and current user subcategories for the current user with the service provider. The current user vector may be used to define the service provider in vector space based on the current user's corresponding subcategories so that the current user may be compared to other users.

Thereafter, at step 412 of flowchart 400, the current user is compared to the past users based on the matrices, the comparison vectors, and/or the user vector. Vector to vector comparison may be performed through the subcat-subcat similarities and one or more of a cosine similarity, a Euclidean distance, or a Pearson correlation coefficient. These algorithms may be utilized to compare closeness of vectors generated from the matrices, such as those designating one or more subcat-subcat similarity based on matching users within cells of the matrices. Moreover, a machine learning engine may utilize these vector comparisons to train a model that determines churn scores for current users based on the churn scores of the past users of the service provider. In this regard, determination of a closeness between the current user's vector and the past users' vectors may be used to estimate a "closest" past user to the current user. Therefore, matching users may be determined for the current user, which have known churn scores based on their attrition with the service provider. At step 414, a predicted churn score is then determined for the current user, which may be based on a closest past user or combination of one or more of these users.

For example, the next closest vector, such as one having the nearest to 1 score for cosine similarity for their angular distance or internal product space between two vectors. When using Euclidean distance score and/or similarity, the Euclidean distance between two vectors may be calculated, where that distance may be converted to a similarity score. Pearson correlation coefficient r may also be utilized to determine similarity between vectorizations determined from the subcat-subcat matrices as follows: $S_{xx}=\Sigma x^2-(\Sigma x)^2/n$, $S_{yy}=\Sigma y^2-(\Sigma y)^2/n$, $S_{xy}=\Sigma xy-(\Sigma x)(\Sigma y)/n$, $r=S_{xy}/sqrt(S_{xx}S_{yy})$. In some embodiments, multiple nearby past users may be determined for a current user. For example, the top 5 closest vectors and/or top 10% closest of all vectors may also be utilized to receive a wider breadth of similar users and additional learnable traits from additional merchants for the machine learning engine. If this does not exceed a threshold likelihood of attrition or date until attrition as predicted based on the churn score of the previous users, then flow chart 400 ends at step 416. However, if this does exceed some threshold, a remediation strategy may be determined for the current user, at step 418. This may include a notification or offer of a service that may be added, extended, or altered for the current user's account with the service provider to retain the service provider.

Thus, at step 420, this strategy is then implemented with the current user, such as by sending account notifications or upgrading the current user's account. A model may be generated for past recommendations that have been successful or unsuccessful in retaining users. For example, different remediation strategies may be generated based on analysis of the past users used and unused services of the service provider. Past users that are similar to the current user may be identified to determine a particular reason for churn, such as if the past user has debt or loss that indicates the user left due to dissatisfaction with risk. Thus, a risk tool or enrollment in a risk or credit program may be extended. Similarly, the past users may have provided a survey or other feedback indicating dissatisfaction, which may further be utilized to determine a particular remediation strategy.

Further, analysis of the current user to successful users and their utilized services and subcategories of the service provider may also be utilized to determine a particular remediation offer that may be beneficial to the current user.

For example, for a current user that indicates a high churn potential, if the current user corresponds to a merchant and the merchant has several charge-backs that impact the merchant negatively, then other successful merchants that have limited chargebacks or utilized risk programs to decrease loss, then a similar service may be offered to the merchant. Thus, analysis of subcategories that other similar current users may be utilized to provide a particular product or service to the current user as a remediation strategy.

Additionally, the model may account for how a current user may view the remediation offer, notification, or other information. In this regard, an analysis of the current user's account access, response to account notifications, and the like may be utilized to determine a best communication channel to transmit the notification to the current user. Thus, if the current user generally responds to emails but does not utilize account interfaces to view notifications, an email of the remediation offers may be transmitted to the current user. The particular email address, phone number, or account may also be considered based on the usage of those particular accounts of the current user.

Figure 5:
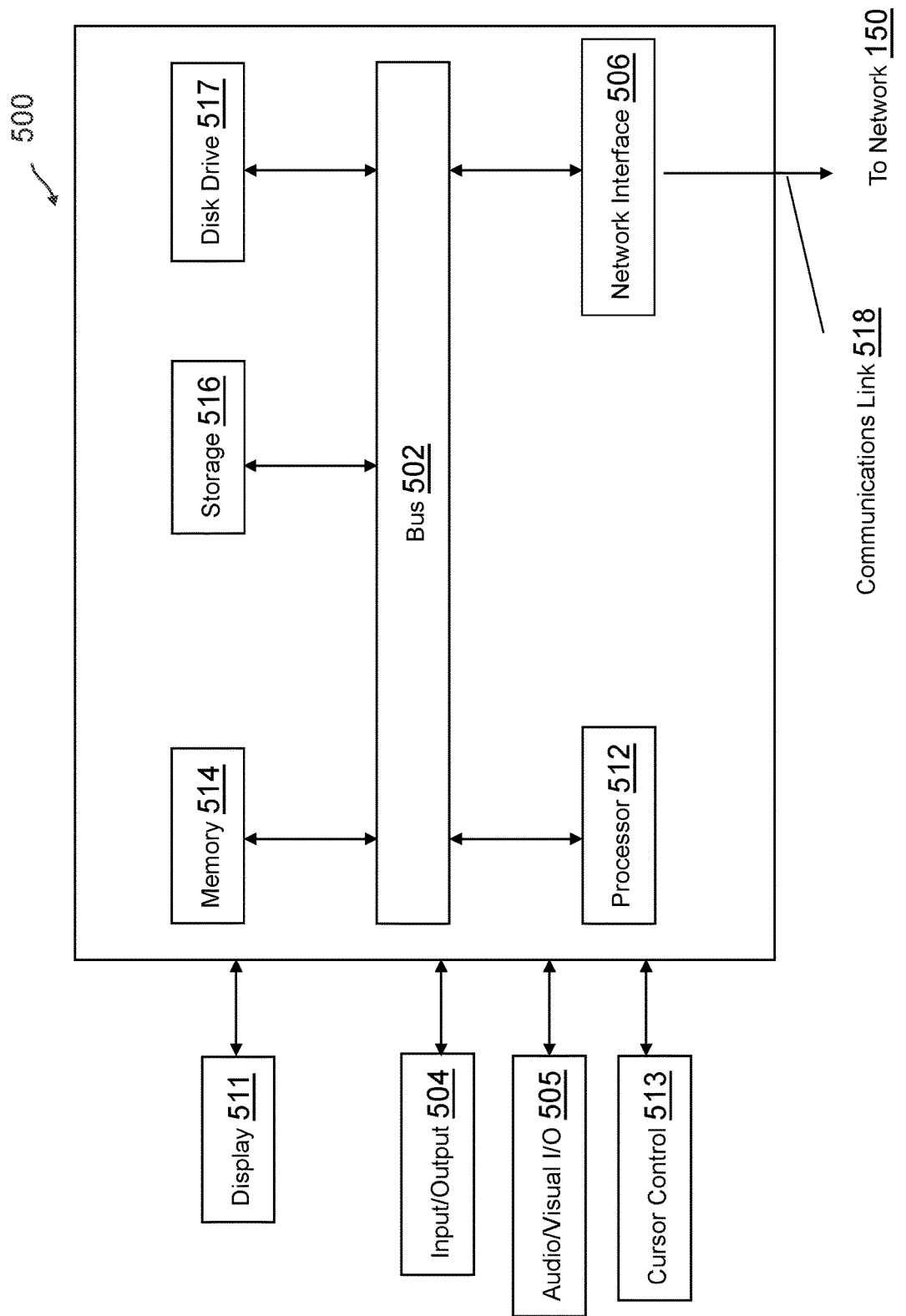
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A service provider system comprising:
   a non-transitory memory; and
   one or more hardware processors coupled to the non-transitory memory and configured to read instructions from the non-transitory memory to cause the service provider system to perform operations comprising:
   accessing account information for an account, wherein the account information is associated with a plurality of services utilized by the account with the service provider system;
   computing a first vector for the account based on the plurality of services;
   comparing, using a machine learning (ML) model trained for vector comparisons of account similarities, the account to a plurality of other accounts using the first vector and a plurality of other account vectors for the plurality of other accounts, wherein the plurality of other account vectors are also based on the plurality of services;
   computing, using the ML model, an account similarity measurement between the first vector and each of the plurality of other account vectors using a vector comparison computational operation; and
   outputting a churn score for the account based on the account similarity measurements.

2. The service provider system of claim 1, wherein the churn score comprises a likelihood of attrition by the account, and wherein the operations further comprise:
   comparing the churn score to a threshold churn score associated with account attritions by the plurality of other accounts with the service provider system; and
   determining that the likelihood of attribution by the account meets or exceeds the threshold churn score to designate the account as indicating a likely future abandonment.

3. The service provider system of claim 2, wherein the operations further comprise:
   identifying at least one of the plurality of other accounts meeting a similarity measurement to the account; and
   determining a reason for the likely future abandonment based on a corresponding one of the account attritions associated with the at least one of the plurality of other accounts.

4. The service provider system of claim 2, wherein the operations further comprise:
   providing an offer associated with an additional one of the plurality of services for use by the account.

5. The service provider system of claim 4, wherein the account and the plurality of other accounts are merchant accounts utilizing merchant services corresponding to the plurality of services, and wherein the offer comprises one of onboarding the account with a seller protection service, voiding or refunding a chargeback to the account, placing a reserve on the account, placing the account in a risk management program, providing credit to the account, lessening a limitation on the account, or lowering a fee imposed on the account.

6. The service provider system of claim 1, wherein the ML model is trained using a training data set comprising historical account uses by the plurality of other accounts of the plurality of services and account attrition data of account abandonments of the plurality of other accounts with the service provider system.

7. The service provider system of claim 1, wherein the comparing further uses, from the first vector and the plurality of other account vectors, a plurality of account categorizations of the account and the plurality of other accounts with the plurality of services, and wherein each of the plurality of account categorizations has a corresponding number of the plurality of other accounts using a corresponding one of the plurality of services.

8. The service provider system of claim 1, wherein the comparing further uses at least one of a cosine similarity, a Euclidean distance, or a Pearson correlation coefficient.

9. A method comprising:
   receiving, by a machine learning (ML) system comprising an ML model trained for merchant account classifications associated with an attrition likelihood, merchant data from a merchant account used by a merchant with an online transaction processor for a plurality of merchant account services;
   generating, by the ML system based on the merchant data for the plurality of merchant account services, a merchant vector for the merchant account; and
   computing, using the ML model, a merchant attrition score associated with the attrition likelihood of the merchant account, wherein the computing comprises:
   inputting the merchant vector with at least one additional merchant vector for at least one additional merchant account to the ML model,
   comparing, using one or more vector comparison operations of the ML model for the attrition likelihood, the merchant account to the at least one additional merchant account using the merchant vector and the at least one additional merchant vector, and
   providing the merchant attrition score based on an output provided by the one or more vector comparison operations.

10. The method of claim 9, wherein the at least one additional merchant account is associated with a usage abandonment of the at least one additional merchant account with a merchant payment processing platform provided by the online transaction processor that contributes to an attrition rate for the attrition likelihood, and wherein the usage abandonment comprises a usage of the at least one additional merchant account at or below a usage threshold over a time period.

11. The method of claim 9, wherein the merchant vector comprises an encoded vector of n-dimensions based on ML features from the merchant data for the merchant vector.

12. The method of claim 11, wherein the ML features for the ML model are based on a feature selection for the ML model that is associated with service categories and service subcategories for the plurality of merchant account services available with the online transaction processor.

13. The method of claim 11, wherein the one or more vector comparison operations compares the merchant vector to the at least one additional merchant vector using a similarity measurement calculation based on the n-dimensions from correlations of the merchant data for the ML features.

14. The method of claim 9, wherein the merchant data comprises account usage data for merchant service categories of the plurality of merchant account services.

15. The method of claim 14, wherein the account usage data further comprises merchant service subcategories for each of the merchant service categories, and wherein the merchant service subcategories are associated with at least a number of uses of a corresponding one of the plurality of merchant account services.

16. A non-transitory machine-readable medium having stored thereon machine-readable instructions executable to cause a machine to perform operations comprising:

accessing account information for a plurality of user accounts, wherein the account information comprises computing service usage data for the plurality of user accounts with computing services provided by an online service provider;

generating, by a machine learning (ML) system comprising an ML model, a plurality of user account vectors for the plurality of user accounts based on features of the computing service usage data for the ML model;

processing the plurality of user account vectors using the ML model, wherein the processing comprises at least one comparison operation that compares the plurality of user account vectors to a plurality of past account vectors for a plurality of past accounts contributing to an attrition rate of the online service provider; and outputting, based on the processing, a plurality of churn scores each indicating a likelihood that a corresponding one of the plurality of user accounts will contribute to the attrition rate at a future time.

17. The non-transitory machine-readable medium of claim 16, wherein the operations further comprise:

comparing the plurality of churn scores to a threshold score; and determining if any of the plurality of churn scores meets or exceeds the threshold score.

18. The non-transitory machine-readable medium of claim 17, wherein the operations further comprise:

for one of the plurality of user accounts meeting or exceeding the threshold score, executing an action with the one of the plurality of user accounts that provides onboarding of the one of the plurality of user accounts with at least one of the computing services at a discounted rate or with a provided benefit.

19. The non-transitory machine-readable medium of claim 18, wherein the operations further comprise:

updating the ML model based on whether the action is successful in retaining the one of the plurality of user accounts over a time period.

20. The non-transitory machine-readable medium of claim 17, wherein the operations further comprise:

for one of the plurality of user accounts that does not meet or exceed the threshold score, determining that the one of the plurality of user accounts meets a similarity requirement to at least one of the plurality of past accounts; and monitoring the one of the plurality of user accounts over a time period for an abandonment indication.

* * * * *